United States Patent Office 2,836,618
Patented May 27, 1958

2,836,618

ADDUCTS OF HYDROGENATED TERPHENYL AND DIALKYL FUMARATES

Joachim Dazzi, Dayton, Ohio, assignor to Monsanto Chemical Company, St. Louis, Mo., a corporation of Delaware No Drawing. Application September 24, 1953
Serial No. 382,192

4 Claims. (Cl. 260—475)

The present invention relates to polycarboxylates and more particularly provides adducts of partially hydrogenated terphenyl and one to four molecular equivalents of esters of fumaric acid, methods of preparing said adducts and vinyl chloride polymers plasticized with the new adducts.

The partially hydrogenated terphenyls which are converted to the new carboxylates by the present process are high-boiling hydrocarbon liquids prepared by incomplete hydrogenation of terphenyl. The present useful, partially hydrogenated terphenyls may be obtained by introducing hydrogen into terphenyl until the terphenyl is substantially 30% to 60% hydrogenated on a molar basis.

Fumarates which I have found to add to the partially hydrogenated terphenyls have the formula

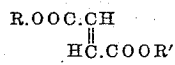

in which R and R' are selected from the class consisting of alkyl and alkoxyalkyl radicals of up to 9 carbon atoms. As illustrative of fumarates useful for the present purpose may be mentioned the simple alkyl fumarates such as methyl, propyl, isoamyl or 2-ethylhexyl fumarates; the mixed alkyl fumarates such as ethyl methyl, butyl heptyl or n-hexyl isopropyl fumarate; the simple alkoxyalkyl fumarates such as methoxymethyl, 4-ethoxybutyl or 2-ethoxyethyl fumarate and alkyl alkoxyalkyl fumarates such as butyl 3-methoxypropyl or 2-ethylhexyl 3-propoxypropyl fumarate.

While I do not know the exact structure of the present hydrogenated terphenyl-fumarate adducts, indications are that the terphenyl adds at the olefinic double bond of the fumarate, and that the addition takes place not only in a 1:1 terphenyl-fumarate molar ratio but that one mole of the terphenyl may add to as many as four moles of the fumarate. The present addition products may thus be represented by the formula

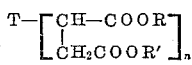

in which T denotes the partially hydrogenated terphenyl residue, R and R' are selected from the class consisting of alkyl and alkoxyalkyl radicals of up to 9 carbon atoms and $n$ is an integer of from 1 to 4.

Reaction of the hydrogenated terphenyl with the fumarate is effected simply by heating a mixture of the two reactants at a temperature of at least 180° C. until formation of the adducts has occurred. The heating temperature is advantageously from 200° C. to 300° C., depending upon the nature of the individual reactants; it should not exceed a temperature at which either reactants or products are decomposed. Refluxing temperatures of the reaction mixture are preferred. Termination of the reaction may then be evidenced by cessation in rise of the refluxing temperature. The course of the reaction may also be followed by noting the change in the refractive index of the reaction mixture. The reaction is generally effected at atmospheric pressure and in the absence of extraneous, inert diluents or solvents; but pressures above atmospheric and/or said diluents may be used.

Depending upon the reactant quantities and reaction conditions, from 1 to 3 moles of the fumarate may be added with one mole of the partially hydrogenated terphenyl. Hence, as many as 6 carboxylic radicals can be present in the adducts. While the reaction product is generally a mixture of adducts in which one mole of the terphenyl has added to one mole of the hydrogenated terphenyl, the nature of the reaction product may be regulated considerably by varying the reactant proportions in the reaction mixture and the heating conditions. Generally the use of substantially equimolar proportions of the terphenyl compound and fumarate will give a predominant proportion of the 1:1 adducts; cessation of the heating at a point when the desired refractive index has been attained in the reaction mixture also serves to guide the course of the reaction, since the longer heating times generally tend to bring about the formation of higher than 1:1 adducts. Usually, irrespective of whether the 1:1 or the higher adducts are desired, it is advantageous to employ an excess of the fumarate in the initial reaction mixture, to observe the course of the reaction by noting the refractive indices of samples withdrawn from the reaction mixture, and to discontinue the heating at a refractive index of the reaction mixture which corresponds to the desired extent of carboxylation, as noted in previous runs. The excess of fumarate facilitates a smooth reaction, permits use of lower reaction temperature and assures participation of a greater quantity of the terphenyl compound in the reaction. The unreacted fumarate is readily recovered from the final reaction product.

The present partially hydrogenated terphenyl-fumarate adducts are stable, high-boiling carboxylates which range from clear, viscous liquids to waxy solids depending upon the number of carboxylate radicals present in the adducts and the alkyl chain length of the fumarates employed in the addition reaction. They are advantageously used for a variety of industrial purposes and are characterized by conferring improved plasticity to synthetic resins and plastics when incorporated therein. They impart increased flexibility to vinyl chloride polymers which flexibility is retained at even low temperatures. The present adducts are not readily volatilized from the plasticized composition, even when present in concentrations of up to 50% by weight. Although the quantity of plasticizer will depend upon the particular polymer to be plasticized and upon its molecular weight, it is generally found that compositions having from 5 percent to 50 percent by weight of plasticizer will, in most cases, be satisfactory for general utility. The good flexibility of the plasticized compositions increases with increasing plasticizer concentration.

In evaluating plasticizer efficiency, use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument & Manufacturing Co. is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature, the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the Low Temperature Flexibility of the composition. The value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is the carbon absorption method of the Society of the Plastics Industry.

*Water resistance.*—The amount of water absorption and the amount of leaching that takes place when the plasticized composition is immersed in distilled water for 24 hours is determined.

The invention is further illustrated, but not limited, by the following examples:

*Example 1*

To a reaction vessel equipped with a mechanical stirrer, thermometer, and a Dean and Stark trap carrying a reflux condenser, there was added 150 g. (0.63 mole) of a partially hydrogenated terphenyl known to the trade as HB-40 and being 40 percent hydrogenated on a molar basis, and 228 g. (1 mole) of butyl fumarate. The reaction mixture was brought to a temperature of 270° C. within 30 minutes and then maintained at a temperature of 265°–271° C. for 2 hours. The refractive index of the initial mixture was 1.4955; at the end of the 2.5 hours, it was 1.5035. Vacuum distillation (in a nitrogen atmosphere) of the resulting reaction mixture to remove material boiling below 180° C./1 mm. gave 198.2 g. of unreacted material. The next fractions consisted of (A) 67.3 g. of material, B. P. 180° C.–220° C./1–2 mm., $n_D^{25}$ 1.5009 and (B) 50.8 g. of material, B. P. 220° C.–235° C./1 mm. The residue from this distillation was then flash distilled (to 230–6° C.) to give 49.3 g. $n_D^{25}$ 1.4885 of the product (C) and 28.4 g. of distillation residue, $n_D^{25}$ 1.4985.

Analysis of the products (A), (B) and (C) gave the following values:

|  | (A) | (B) | (C) |
| --- | --- | --- | --- |
| Percent C | 81.56 | 72.18 | 68.10 |
| Percent H | 9.12 | 8.93 | 8.78 |

The calculated values for a 1:1 HB-40-butyl fumarate adduct, a 1:2 HB-40-butyl fumarate adduct, for HB-40 (mol. wt. 238.4) alone, and for butyl fumarate, alone are as follows:

|  | 1:1 adduct | 1:2 adduct | HB-40 | Butyl Fumarate |
| --- | --- | --- | --- | --- |
| Percent C | 77.2 | 72.7 | 90.7 | 63.2 |
| Percent H | 9.12 | 8.97 | 9.3 | 8.78 |

From the above, it is apparent that product (A) represents primarily a mixture of unreacted starting materials; that product (B) is probably primarily a 1:2 adduct or a mixture of adducts in which from 1 to 3 moles of butyl fumarate are combined with one mole of the partially hydrogenated terphenyl, and (C) is primarily an adduct in which more than 2 moles of the fumarate are combined with one mole of the hydrocarbon or a mixture of adducts containing a major proportion of adducts of high fumarate content.

The products (A), (B) and (C) were evaluated for plasticizer efficiency as shown in Example 2.

*Example 2*

Sixty parts of polyvinyl chloride was respectively mixed with 40 parts by weight of each of products (A), (B) and (C) of Example 1 on a rolling mill to a homogeneous blend. A large amount of fuming was observed during the milling only with the (A)-containing mixture. Molded sheets from all three milled mixtures were clear and transparent. Testing of the molded sheets for low temperature flexibility, volatility and water-resistance according to the test procedures described above gave the following values:

|  | (A) | (B) | (C) |
| --- | --- | --- | --- |
| Low tem. flex. °C | minus 19.9 | minus 16.5 | minus 7.8 |
| Volatility, percent | 33.40 | 9.79 | 2.39 |
| Shore Hardness: |  |  |  |
| Before Vol. test | 76 | 76 | 80 |
| After Vol. test | 86 | 76 | 81 |
| Water Absorption, percent | 0.502 | 0.547 | 0.578 |
| Solids loss (in water), percent | 0.178 | 0.072 | 0.057 |

The above data show that while product (A), the essentially HB-40 material, confers good low temperature flexibility to polyvinyl chloride, it is so readily volatilized from the plasticized composition as to be of no practical utility. Its very ready volatilization has a decided effect on hardness of the composition after heating. HB-40, alone, was found to be incompatible with polyvinyl chloride at 40 percent concentration. On the other hand, products (B) and (C), essentially HB-40-fumarate adducts, confer low temperature flexibility properties to polyvinyl chloride and are not readily volatilized therefrom, yielding materials whose hardness is substantially unchanged by the volatility test.

Instead of the adducts shown in the above examples, adducts of partially hydrogenated terphenyl and other alkyl fumarates, e. g., amyl, propyl or 2-ethylhexyl fumarate, or butyl propyl and ethyl n-octyl fumarate, or 4-methoxybutyl or methoxymethyl fumarate are similarly obtained and are likewise useful in the formulation of stable vinyl chloride polymer compositions of good low temperature flexibility properties.

While the above examples show only compositions in which the ratio of plasticizer to polymer content is 40:60, this ratio being employed in order to get comparable efficiencies, the content of adduct to polyvinyl chloride may be widely varied, depending upon the properties desired in the final product. For many purposes a plasticizer content of, say, from only 10 percent to 20 percent is preferred. The present adducts are compatible with polyvinyl chloride over wide ranges of concentrations, up to 50 percent of adduct based on the total weight of the plasticized composition yielding desirable products.

Although the invention has been described particularly with reference to the use of the present adducts as plasticizers for polyvinyl chloride, the adducts are advantageously employed also as plasticizers for copolymers of vinyl chloride, for example, the copolymers of vinyl chloride with vinyl acetate or vinylidene chloride, etc. Preferably such copolymers have a high vinyl chloride content, i. e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized compositions does not impair the valuable properties of the adducts. The partially hydrogenated terphenyl-fumarate adducts are of general utility in softening vinyl chloride polymers. They may be used as the only plasticizing component in a compounded vinyl chloride polymer or they may be used in conjunction with other plasticizers.

What I claim is:

1. An addition product having the formula $$T-\left[\begin{array}{c}CH-COOR\\ |\\ CH_2COOR'\end{array}\right]_n$$

in which T represents a hydrogenated terphenyl radical which is substantially 30% to 60% hydrogenated on a molar basis, R and R' are alkyl radicals of up to 9 carbon atoms, and $n$ is an integer of from 1 to 4.

2. An addition product having the formula $$T-\left[\begin{array}{c}CH-COO(CH_2)_3CH_3\\ |\\ CH_2-COO(CH_2)_3CH_3\end{array}\right]_n$$

in which T represents a hydrogenated terphenyl radical which is substantially 30% to 60% hydrogenated on a molar basis and $n$ is an integer of from 1 to 4.

3. The method which comprises heating at a temperature of 180° C. to 300° C. hydrogenated terphenyl which is substantially 30% to 60% hydrogenated on a molar basis with a fumarate having the formula $$\begin{array}{c}ROOC.CH\\ \|\\ HC.COOR'\end{array}$$

in which R and R' are selected from the class consisting of alkyl and alkoxyalkyl radicals of up to 9 carbon atoms and recovering from the resulting reaction mixture an addition product of the formula $$T-\left[\begin{array}{c}CH-COOR\\ |\\ CH_2-COOR'\end{array}\right]_n$$

in which T represents a hydrogenated terphenyl radical which is substantially 30% to 60% hydrogenated on a molar basis, R and R' are alkyl radicals of up to 9 carbon atoms and $n$ is an integer of from 1 to 4.

4. The method which comprises heating at a temperature of 180° C. to 300° C. hydrogenated terphenyl which is substantially 30% to 60% hydrogenated on a molar basis with butyl fumarate and recovering from the resulting reaction mixture an addition product having the formula $$T-\left[\begin{array}{c}CH-COO(CH_2)_3CH_3\\ |\\ CH_2-COO(CH_2)_3CH_3\end{array}\right]_n$$

in which T is a hydrogenated terphenyl which is substantially 30% to 60% hydrogenated on a molar basis radical and $n$ is an integer of from 1 to 4.

References Cited in the file of this patent

UNITED STATES PATENTS

| | | |
|---|---|---|
| 2,301,867 | Gresham | Nov. 10, 1942 |
| 2,511,578 | Geiger | June 13, 1950 |
| 2,570,038 | Smith | Oct. 2, 1951 |
| 2,630,418 | Dazzi | Mar. 3, 1953 |
| 2,665,304 | Patrick | Jan. 5, 1954 |
| 2,752,387 | Rehberg | June 26, 1956 |

OTHER REFERENCES

Basu et al.: Proc. Roy. Soc. (London), A202, 488–489 (1950).